No. 879,212. PATENTED FEB. 18, 1908.
F. J. TESSMER.
CHUCK.
APPLICATION FILED MAY 6, 1907.
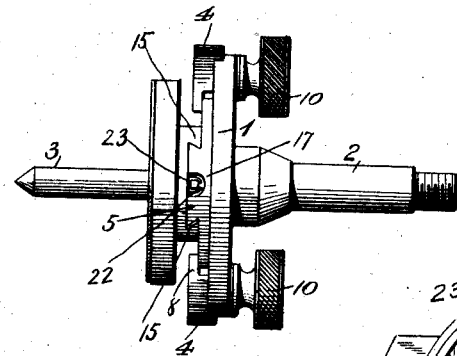
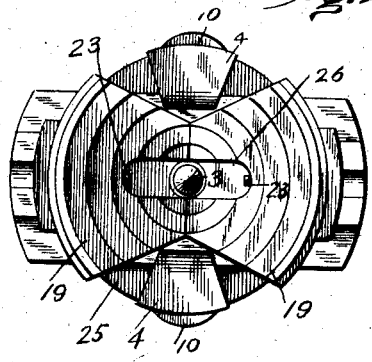
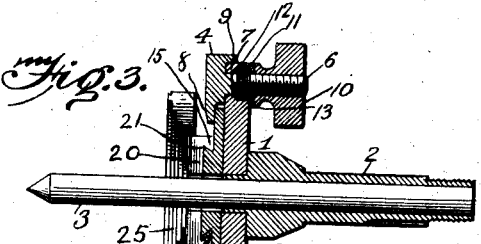
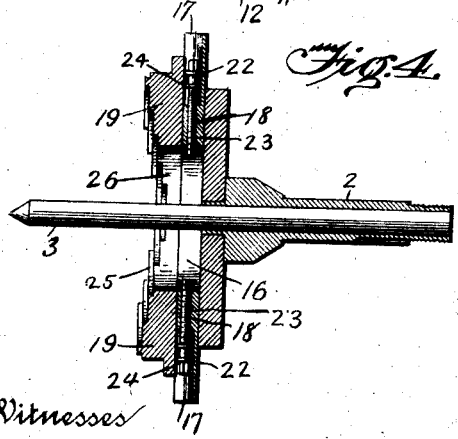
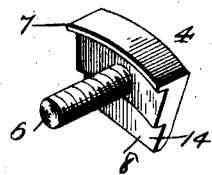
Witnesses
F. L. Ourand
C. H. Griesbauer
Inventor
Frank J. Tessmer,
by H. B. Willson & Co.
Attorneys

UNITED STATES PATENT OFFICE.

FRANK J. TESSMER, OF ST. LOUIS, MISSOURI.

CHUCK.

No. 879,212.      Specification of Letters Patent.      Patented Feb. 18, 1908.

Application filed May 6, 1907. Serial No. 372,107.

*To all whom it may concern:*

Be it known that I, FRANK J. TESSMER, a citizen of the United States, residing at St. Louis, in the county of St. Louis City and State of Missouri, have invented certain new and useful Improvements in Chucks; and I do declare the following to be a full, clear, and exact description of the invention, such as will enable others skilled in the art to which it appertains to make and use the same.

This invention relates to chucks, and more particularly to chucks adapted to be used by watchmakers and others who frequently are required to turn articles eccentrically, that is, off the center.

The object of the invention is to provide a device of this kind which will be very simple, and which will firmly hold the material or article being operated upon, and, at the same time, permit of its being held centrally or eccentrically, the amount of eccentricity or movement off the center being very great for a tool as simple and compact as is embodied in my invention.

In the accompanying drawings, which illustrate the invention, Figure 1 is a side or edge elevation of a chuck embodying my invention; Fig. 2 is a front elevation of the same; Fig. 3 is a longitudinal cross sectional view; Fig. 4 is a transverse cross sectional view; and Fig. 5 is a perspective view of one of the clamps for holding the chuck to the face plate.

Referring more particularly to the drawings, 1 indicates a face plate, which is adapted to be secured in the head stock of a lathe in any suitable manner, as by means of the mandrel, 2, through which is adapted to be placed the ordinary center pin 3.

Reciprocally mounted upon the face plate in any desired manner, preferably by means of the clamping blocks, 4, is a chuck block, 5. In the form of clamps shown in the drawings, the inner face is provided with a screw threaded stem, 6, a flange, 7, and a lip or holding portion, 8. The stem is adapted to project through an opening, 9, in the face plate, 1, and to receive a nut, 10, for holding it against the plate. A spring 11 is preferably provided between the nut and the face plate to secure a yielding pressure, and is adapted to be seated within the outer end of the opening, 9, which is preferably counterbored, as at 12, for that purpose. A washer 13 is also preferably seated between the outer end of the spring and the inner face of the nut to prevent the nut from turning or damaging the spring, and, especially when the nut is being given its final turns for securing the parts together. The clamps 4 are located diametrically opposite each other with the flange 7 extending beyond the periphery of the face plate, and having the inner end preferably slightly reduced as by making the walls or sides, 14, slightly converging.

The chuck block 5 is provided on its outer face with guide ways, 15, and is slotted longitudinally, as shown at 16, which slot extends upon both sides of the center. Each end is provided with a longitudinally arranged recess, 17, which extends in nearly to the end of the slot 16, and the portion of said block between the recess and the end of the slot is perforated longitudinally of the block, as shown at 18, and screw-threaded. The block is of sufficient width to extend under the inner ends or clamping lips, 8, of the clamps 4 and be thereby securely held against the plate by frictional contact. The slot 16 may be made a trifle wider than the diameter of the center pin, 3, so as to permit a slight lateral movement of the chuck block if desired, and the edges may terminate a short distance from the inner end or shoulder of the block 4, whereby the chuck block may have a slight rotary motion upon the face plate, if desired.

Reciprocally mounted upon the chuck block are two jaws, 19, the rear face of each of which is recessed as shown at 20, and provided with undercut flanges, 21, which are adapted to engage with the flanged edges of the chuck block 5 and thereby hold the jaws against movement, except longitudinally of the chuck block. The outer end of the recessed portion 20 of each jaw is provided with a suitable yoke bearing 22, for a screw, 23. The inner end of the screw is adapted to fit in the perforations 18, and the outer end is provided with shoulders 24, for engaging with the bearing 22, and is also made angular in cross section to receive a key, not shown, for rotating the screw and thereby moving the jaw upon the chuck block in the ordinary manner. The inner or holding face of each jaw is provided with means for gripping an article, as segmental shoulders, 25, the shoulders being arranged in the form of steps extending from the inner portion of the jaw to the periphery. The jaws are also preferably formed substantially segmental with their inner ends each provided with an elongated slot, 26, for permitting it to pass beyond the center pin of the chuck, and especially when the chuck block has been moved so far as to cause the center pin to stand nearer one end of its slot than the other.

By constructing a chuck in the above described manner, it is evident that it will be very simple, strong and durable, and will permit of a great variety of work or articles being held therein in position for being turned or operated upon by ordinary tools, or other appliances used upon or in connection with lathes, and especially lathes used by watchmakers, jewelers, etc. The adjustment is very wide for a tool of such compact dimensions, and the work will be held very rigidly and in the desired position.

Although I have described my invention as particularly adapted for use by watchmakers, it is evident that it can be made larger and thereby be adapted for use upon larger lathes in which heavier articles are to be operated upon or otherwise treated.

Having thus fully described my invention, what I claim as new and desire to secure by Letters-Patent, is:

1. In a chuck, a centrally perforated face plate, a slotted chuck block thereon in position to be moved in all directions at right-angles to the axis of the chuck, jaws upon said block, and oppositely located clamps for holding said block against the face plate.

2. In a chuck, a face plate having two diametrically oppositely located perforations, two clamps, each of which is provided with a screw threaded stem which projects through one of said perforations, a nut on said stem, and a chuck block having its edges adapted to be engaged by said clamps, and oppositely located jaws movably mounted upon said block.

3. In a chuck, a face plate provided with diametrically oppositely located perforations, the outer portion of each of which is counter-bored, two clamps, each of which is provided with a screw threaded stem which is adapted to project through one of said openings, a spring upon said stem and adapted to be seated in said bore, a nut on each stem adapted to engage with the spring, a chuck block adapted to be engaged by said clamps, and oppositely located jaws movably secured upon said block.

4. In a chuck, a face plate provided with two oppositely located perforations, two clamps, the inner face of each of which is provided with a screw-threaded stem, a segmental flange and an inwardly extending lip, said stems being adapted to project through said openings and each provided with a nut, a chuck block having its edges adapted to be engaged by said lips, and oppositely located jaws movably mounted upon the ends of said block.

5. In a chuck, a centrally perforated face plate, a slotted chuck block adapted to be adjustably secured upon the face plate, and oppositely located jaws movably mounted upon said chuck block, the inner face of said jaws being provided with segmental shoulders arranged in step-like order from their inner ends outward, the inner end of each jaw being provided with a slot-like recess.

In testimony whereof I have hereunto set my hand in presence of two subscribing witnesses.

FRANK J. TESSMER.

Witnesses:
 JNO. P. FECHTER,
 LOUIS BRAMSH.